United States Patent [19]
Pollack et al.

[11] 3,928,850
[45] Dec. 23, 1975

[54] INTERFERING SIGNAL SENSOR FOR ANGLE TRACKING RADARS

[75] Inventors: Philip Pollack, Wantagh; Paul L. Di Matteo, Levittown, both of N.Y.

[73] Assignee: Sperry Rand Corporation, New York, N.Y.

[22] Filed: Dec. 29, 1958

[21] Appl. No.: 783,603

[52] U.S. Cl. ............................... 343/7.3; 343/16 M
[51] Int. Cl.² ........................ G01S 9/14; G01S 7/36
[58] Field of Search .................. 343/7.3, 16 M, 18 E

[56] References Cited
UNITED STATES PATENTS

| | | | |
|---|---|---|---|
| 3,316,548 | 4/1967 | D'Amico | 343/7.3 X |
| 3,564,547 | 2/1971 | Dent | 343/7.3 |
| 3,827,049 | 7/1974 | van Staaden et al. | 343/7.3 |

*Primary Examiner*—T. H. Tubbesing
*Attorney, Agent, or Firm*—Howard P. Terry

EXEMPLARY CLAIM

1. In an angle tracking radar receiver, first means for generating a first signal representing the angular deviation relative to the radar tracking axis of a predetermined target, second means for generating a second signal representing the angular deviation relative to said axis of the target nearest the radar, means for comparing said first and second signals and for generating a first control signal upon the inequality of said first and second signals, means for sensing the closure within a predetermined range interval of said predetermined target and another target situated at lesser range, said means for sensing producing a second control signal upon said range closure, utilization signal generating means, and means for applying said first and second control signals to said last-named means to produce said utilization signal upon the concurrence of said first and second control signals.

5 Claims, 2 Drawing Figures

INTERFERING SIGNAL SENSOR FOR ANGLE TRACKING RADARS

The invention herein described was made in the course of or under a contract or subcontract thereunder, with the Department of the Navy.

The present invention generally relates to anti-jamming circuits and, more particularly, to a system for detecting and evaluating the imminent jamming effect of an interfering signal on a radar engaged in the angle tracking of a particular target of interest.

Tracking radars such as, for example, the so-called "monopulse" radar, are adapted for the tracking of a target in angle as well as in range. Target data for purposes of angle tracking is generally obtained by the technique of radiating a plurality of beams of microwave energy which overlap along the boresight or tracking axis of the radar antenna. By comparing the relative amplitudes of the target signal as received in the overlapping beams, a measure may be obtained of the magnitude and sense of the target deviation from the tracking axis.

Tactical situations arise, however, which might cause the automatic tracking circuits of the radar to lose the predetermined target of interest and follow instead the angle and range corresponding to an interfering target. For example, if the predetermined target is being tracked in angle and range and then stronger signals from an interfering target are received, the possibility exists that the automatic tracking circuits will tend to follow the interfering target subsequent to the passing of the targets through substantially the same range. Of course, no tracking problem exists where the predetermined and the interfering targets close in range along the same deviation angle because of the inevitable collision between the two. The tracking problem arises, therefore, when the interfering target closes in range with the predetermined target but along a different boresight deviation angle whereupon the radar tracking circuits might tend to follow the interfering target subsequent to such range closure.

This inherent tendency of an angle tracking radar to fail to adhere unswervingly to the signal corresponding to the predetermined target has been exploited by the use of chaff dispensers which create strong signal returns emanating from a target intervening the radar and the predetermined target and oriented along a deviation line different from that of the predetermined target.

It is the principal object of the present invention to provide interfering target sensing means for use in an angle tracking radar to produce an alert signal upon the imminence of an interfering target signal emanating from a direction other than that of a predetermined target being tracked.

Another object of the present invention is to provide means for distinguishing the presence of an interfering signal representing a target situated along a boresight deviation angle other than that of the predetermined target and for sensing the imminent range closure of the two targets.

A further object of the present invention is to continuously compare data signals respectively representing the relative angular deviation of an interfering target and a predetermined target and to produce an alert signal upon the simultaneous occurrence of inequality between the data signals and the range closure of the two targets.

These and other objects of the present invention, as will appear upon a reading of the following specification, are achieved in a preferred embodiment by the provision of a monopulse radar adapted for the automatic angle and range tracking of target signals. Automatic range gate generating means are included which actuate the angle and range tracking circuits solely in response to signals representing the target being tracked. A first output signal is produced by the angle tracking circuits actuated in response to the range gate, the first output signal representing the angular deviation of the target being tracked relative to the radar tracking axis. Auxiliary gate generating means are provided to produce an actuating signal concurrently with the reception of the signal from the nearest target. The actuating signal is applied to respectively associated angle tracking circuits producing a second output signal representing the angular deviation of the nearest target from the radar tracking axis. The first and second output signals are then compared to determine the relative angular deviation of the nearest target and the target being tracked.

Additional means are included for the generation of an advance gating signal occurring a fixed time earlier than the range gate in each radar repetition interval. The advance gating signal is employed to ascertain the range closure of the target being tracked with another target situated at a range shorter than that of the tracked target by an amount corresponding to the said fixed time. Upon the concurrence of range closure between the target being tracked and another target within the fixed time (range) interval and the determination of angular deviation between the nearest target and the target being tracked, an alert signal is produced.

The alert signal indicates to the radar operator the imminence of a target situation in which there is likelihood that the automatic tracking circuits may cease to follow the predetermined target previously being tracked. The alert signal could also be employed as an automatic control signal, for example, to maintain the tracking rates of the angle and range tracking circuits of the radar last obtaining before the generation of the alert signal. The maintenance of such tracking rates lessens the problem of target reacquisition following the disappearance of the interfering target signal.

For a more complete understanding of the present invention, reference should be had to the following specification and to the appended figures of which:

Figure 1:
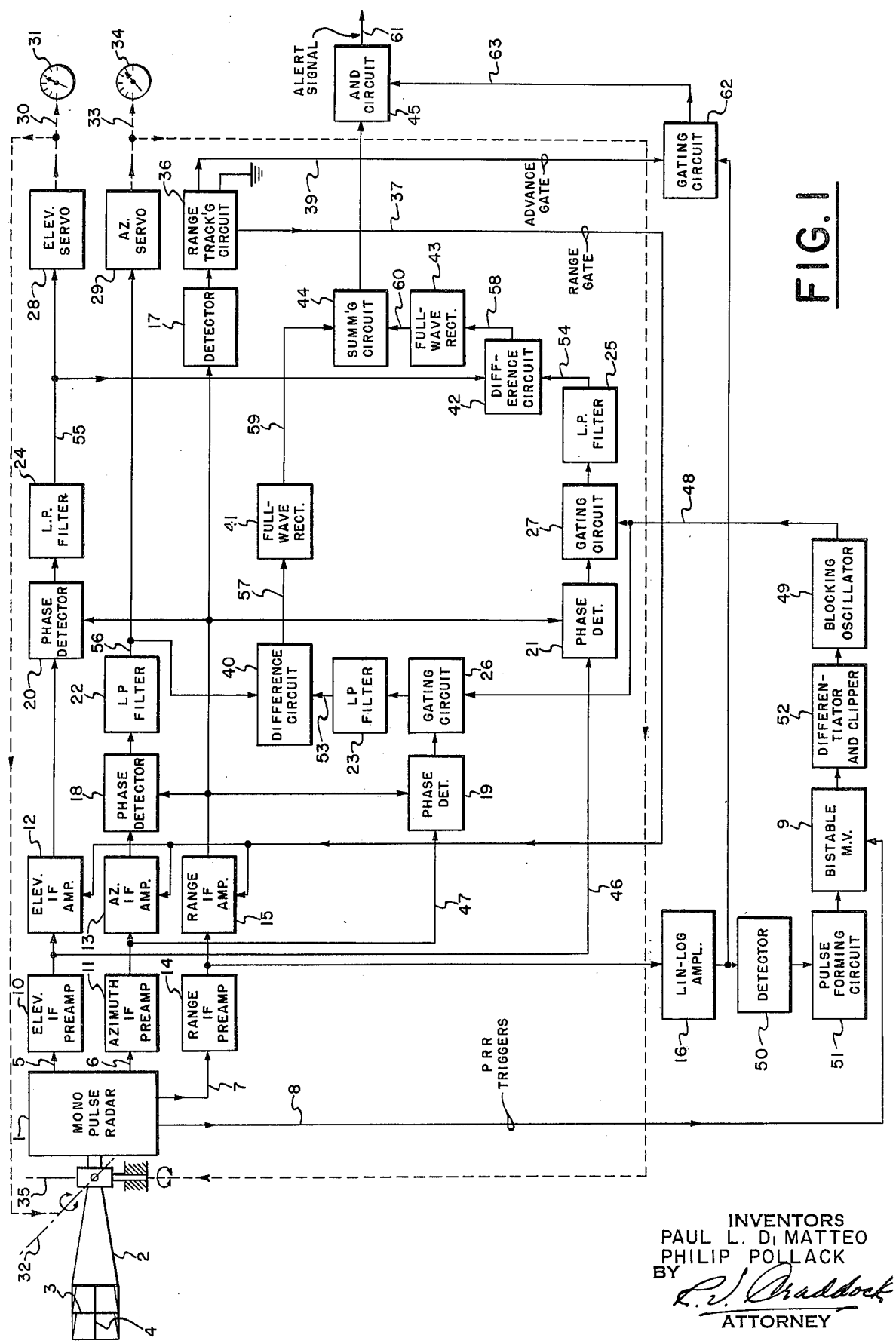
FIG. 1 is a preferred embodiment of the present invention.

In FIG. 1, a conventional monopulse radar is represented by the numeral 1. Microwave energy generated by the transmitter included in radar 1 is radiated by four-quadrant horn 2. Radar 1 and horn 2 may be of the type disclosed in U.S. Pat. No. 2,759,154 issued to P. G. Smith et al on Aug. 14, 1956 and assigned to the present assignee. Horn 2 is divided into four quadrant portions by septums 3 and 4. As described in the aforementioned patent, a comparator device included within radar 1 compares the relative magnitudes of the energies received above and below septum 4 and compares the relative amplitudes of the energies received on either side of septum 3. A difference signal representing the relative amplitudes of the energies received above and below septum 4 is applied to the input of the elevation tracking channel by line 5. Similarly, a difference signal representing the relative amplitudes of the energies received on either side of septum 3 is directed by line 6 to the input of the azimuth tracking channel.

An additional output is produced by radar 1 for the actuation of the range tracking apparatus. This additional signal is produced on line 7 and is proportional to the sum of the energies received in all four quadrant portions of horn 2. Finally, radar 1 produces on line 8 a series of pulse repetition rate triggers for application to the reset terminal of bistable multivibrator 9.

The elevation and azimuth difference signals are respectively applied to IF preamplifiers 10 and 11. The outputs of preamplifiers 10 and 11 are respectively applied to the inputs of elevation IF amplifier 12 and azimuth IF amplifier 13. The output of range IF preamplifier 14 is directed both to the input of range IF amplifier 15 and lin-log amplifier 16. The output signal of amplifier 15 is applied to detector 17 and as a reference signal to phase detectors 18, 19, 20 and 21. Phase detectors 18 and 19 are additionally responsive to azimuth deviation signals respectively applied from amplifier 13 and preamplifier 11. Similarly, phase detectors 20 and 21 are both additionally responsive to elevation deviation signals respectively applied from amplifier 12 and preamplifier 10.

The purpose of the phase detectors such as detectors 18, 19, 20, and 21, as more fully described in U.S. Pat. No. 2,759,154, is to generate output signals respectively indicating the amplitude and sense of deviation of the target from the tracking or boresight axis of horn 2 both in elevation and in azimuth. As will be more fully described later, phase detectors 18 and 20 and phase detectors 19 and 21 are time-gated in pairs, the gating intervals not necessarily being the same.

The d.c. signal component is of interest at the outputs of detectors 18, 19, 20 and 21. It is extracted, respectively, in low pass filters 22, 23, 24 and 25. Phase detector 19 is coupled to filter 23 by gating circuit 26; phase detector 21 is coupled to filter 25 by gating circuit 27.

The output of filter 24 is applied as a control signal to elevation servo 28. Similarly, the output signal of filter 22 is applied as a control signal to azimuth servo 29. The mechanical shaft output 30 of servo 28 simultaneously positions elevation deviation indicator 31 and horn 2 about horizontal axis 32. The mechanical shaft output 33 of servo 29 is drivably connected to azimuth deviation indicator 34 and positions horn 2 about vertical axis 35. The detected signal output of detector 17 is applied to the input of range tracking circuit 36.

Range tracking circuit 36 comprises conventional circuit components for the acquisition and automatic tracking of a target signal. Circuit 36 may be generally similar to, for example, the automatic range gating circuit disclosed in U.S. Pat. No. 3,543,072 issued to H. M. Stearns on February 27, 1951 and assigned to the present assignee. A range gating signal is produced on output line 37. The additional output signal of circuit 36, appearing on line 39 is an advance gating pulse occurring a fixed time earlier than the occurrence of the range gate of line 37. The range gating pulse of line 37, which automatically tracks the target signal, may be produced by conventional pulse delay circuitry within circuit 36 from the advance gating pulse appearing on output line 39. In terms of said patent this can be readily accomplished by introducing a delay circuit between the output of Stearns' gate generator 25 and the junction of the lines leading to delay line 29 and switch 38. Assuming that such modification of the Stearns' disclosure is made, then the aforementioned advance gating pulse would be available at the output of gate generator 25.

The outputs of low pass filters 22 and 23 are applied to difference circuit 40. Circuit 40 produces an output signal for application to full wave rectifier 41 representing the algebraic difference between the d.c. output signals of filters 22 and 23. Similarly, the outputs of filters 24 and 25 are applied to difference circuit 42 which produces an output signal for application to full wave rectifier 43 representing the algebraic difference between the d.c. output signals of filters 24 and 25. The outputs of rectifiers 41 and 43 are additively combined in summing circuit 44. The output of circuit 44 is applied as a first input signal to AND circuit 45.

The range gate appearing on line 37 is simultaneously applied to and actuates amplifiers 12, 13 and 15. Thus, phase detectors 20 and 18, respectively connected to the outputs of amplifiers 12 and 13 receive input signals solely during the occurrence of the range gate. Phase detector 21, like phase detector 20, is also connected to elevation preamplifier 10. Phase detector 21, however, continuously receives the elevation data signal on line 46. Similarly, phase detector 19 continuously receives data signals on line 47. Gating circuits 26 and 27 at the outputs of phase detectors 19 and 21, respectively, are actuated concurrently by the gating signal produced at line 48 at the output of blocking oscillator 49. As will be seen, the time of actuation of IF amplifiers 12 and 13 and of gating circuits 27 and 26 may or may not be the same depending on the target signal situation.

The range IF signal at the output of lin-log amplifier 16 is applied to detector 50 which, in cooperation with pulse-forming circuit 51, produces a sharp video pulse in response to each received signal to set bistable multivibrator 9. Multivibrator 9 is automatically reset by the pulse repetition rate triggers of line 8 so that multivibrator 9 is placed into a predetermined condition by the video pulse corresponding to the first signal received subsequent to each pulse transmitted by the radar.

The output signal of multivibrator 9 is applied to differentiator and clipper 52 providing an output pulse substantially coincident with the first signal received during each radar pulse repetition interval. The additional pulse of opposite polarity resulting from the differentiation of the multivibrator output signal, corresponding to the resetting of the multivibrator by the pulses of line 8, is rejected by the clipper included within circuit 52. The output pulses from circuit 52 is applied to and triggers blocking oscillator 49.

Figure 2:
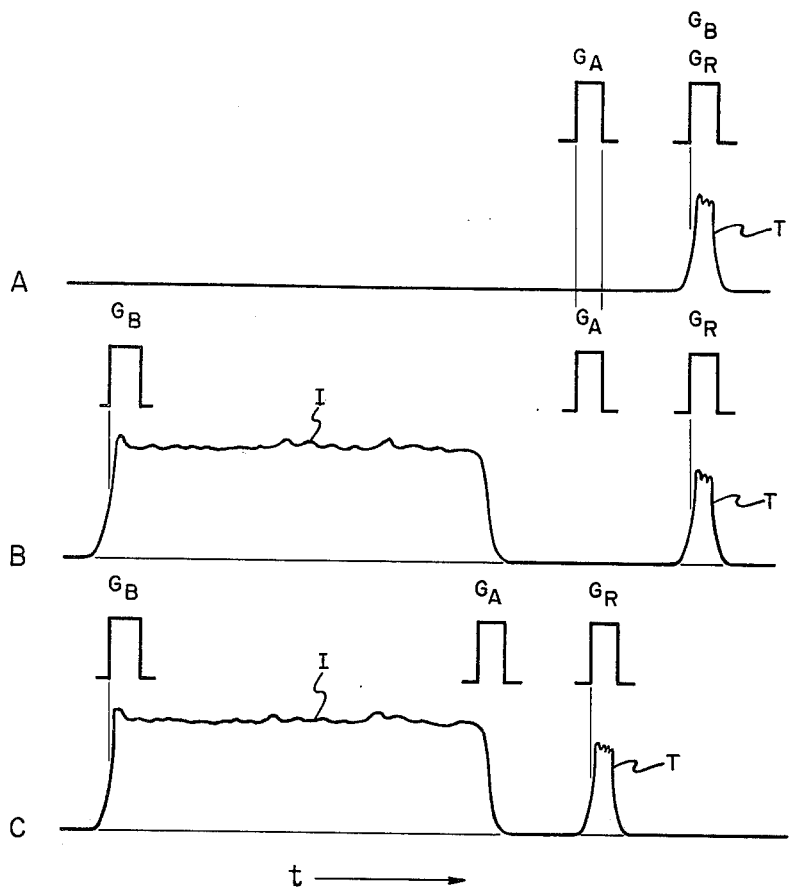
FIG. 2 is a series of time diagrams useful in explaining the operation of the apparatus of FIG. 1.

The additional structure and operation of the apparatus of FIG. 1 will be explained with the aid of the time diagrams of FIG. 2. Diagram A of FIG. 2, having the amplitude and time coordinates of an A scope display, depicts the time of reception of a single target pulse T. Range tracking circuit 36 of FIG. 1 automatically aligns the range gate of line 37 with the target pulse T. Pulse T, representing the sole target in this case, causes the production of a concurrent blocking oscillator gate on line 48. As previously described, range tracking circuit 36 also generates an advance gate occurring a predetermined time prior to the generation of the range gate in each radar repetition interval. The advance gate, blocking oscillator gate and range gate are represented, respectively, by pulses $G_A$, $G_B$ and $G_R$ in diagram A of

FIG. 2.

An interfering signal I is shown in time diagram B occurring at a range shorter than that of target T. For purposes of the present invention, interfering signal I may be considered as being produced by chaff dispensed, for example, by forward-firing rockets launched from target T, target T being an incoming aircraft. The present invention is particularly suited to monitor the range closure of target T with interfering signal I and to determine the likelihood of continuity of tracking of target T following the entrance of target T into the time increment occupied by interfering signal I. An alert signal is produced if it appears that the continuity of tracking of target T may be disrupted.

The blocking oscillator gate $G_B$ is aligned in time diagram B substantially with the leading edge of interfering signal I. The range gate $G_R$ is still tracking the target signal T. The advance gate $G_A$, separated in time from range gate $G_R$ by the same amount shown in time diagram A, has not yet entered the time increment occupied by interfering signal I. In this case, blocking oscillator gate $G_B$, appearing on line 48, simultaneously actuates gating circuits 26 and 27 to produce on lines 53 and 54, respectively, a d.c. signal component having an amplitude and polarity representing the angular deviation of the interfering signal I from the boresight axis of horn 2. Similarly, the range gate appearing on line 37 simultaneously actuates IF amplifiers 12 and 13 to produce on lines 55 and 56, respectively, a d.c. signal component representing the angular deviation of target T from the said boresight axis.

The d.c. signal components of lines 53 and 56 are compared in difference circuit 40 to produce an output signal on line 57 only in the event that the azimuth angle deviation of interfering signal I and target signal T is not the same. The d.c. signal components of lines 54 and 55 are likewise compared in difference circuit 42 to produce an output signal on line 58 in the event that the elevation deviations of interfering signal I and target signal T are different.

It will be noted that if signals I and T emanate from different directions, the signals on lines 57 and 58 may be of either polarity and of varying magnitude depending upon the relative boresight angle deviation of the received signals I and T. Full wave rectifiers 41 and 43 therefore are provided to produce on output lines 59 and 60, respectively, d.c. signal components representing the absolute difference in deviation from the received directions of signals I and T. The signals of lines 59 and 60 are additively combined in summing circuit 44 to produce a first input signal for application to AND circuit 45.

The rationale determining the operation of AND circuit 45 is that if the deviation angles of signals I and T are identical, then there is no likelihood of interference in the angular tracking of target T should target T enter the range (time) increment occupied by signal I. On the other hand, AND circuit 45 is to be rendered operative to produce an alert signal on line 61 upon the simultaneous satisfaction of the two conditions: (1) The existence of deviation between the directions in which signals I and T are received and (2) the time-superpositioning of advance gate $G_A$ with signal I resulting from range closure between the two.

Assuming that deviation in direction exists between signals I and T, then as the moving aircraft representing target T closes in range with the relatively stationary chaff produced interfering signal I, advance gate $G_A$ ultimately will reach the trailing edge of signal I as shown in diagram C. The instant of time depicted in diagram C may be the last one when the radar operator may expect to receive accurate tracking data relative to target T. A relatively short time thereafter, target T, along with tracking range gate $G_R$, will reach the lesser range of signal I with the definite possibility that reliable tracking operation will then cease.

The range closure of signal I with advance gate $G_A$ is monitored by gating circuit 62 which receives a first input signal ($G_A$) from line 39 at the output of range tracking circuit 36 and a second input signal (I) from the output of lin-log amplifier 16. Upon the concurrence of advance gate $G_A$ and signal I, gating circuit 62 will produce on line 63 a signal satisfying the second conduction requirement of AND circuit 45 and an alert signal will appear on line 61.

It will be recognized by those skilled in the art that the alert signal may be employed for different tactical purposes. For example, the alert signal may simply inform the operator that the immediately following data relative to the target being tracked (T) may not be reliable. Alternately, the alert signal may be used as an automatic control signal for placing the apparatus of FIG. 1 into a memory mode of operation utilizing the range, elevation, and azimuth data rates last prevailing at the time depicted in diagram B. The use to which the alert signal of line 61 may be put forms no integral part of the present invention and for that reason as well as for the sake of simplicity and clarity, illustrative automatic mechanisms for responding to the alert signal have been omitted from the specification.

From the preceding it can be seen that the objects of the present invention have been achieved in an angle tracking radar by the provision of first and second means for independently sensing the boresight axis deviations of an incoming target being tracked and the first target received during each radar repetition interval. Means are also provided for detecting the approach in range of the target being tracked with another target, the latter having a lesser initial range. An alert signal is produced when the target being tracked has closed within a predetermined range with the other target and when the angular deviation of the tracked target and the first received target is different relative to the radar boresight axis.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In an angle tracking radar receiver, first means for generating a first signal representing the angular deviation relative to the radar tracking axis of a predetermined target, second means for generating a second signal representing the angular deviation relative to said axis of the target nearest the radar, means for comparing said first and second signals and for generating a first control signal upon the inequality of said first and second signals, means for sensing the closure within a predetermined range interval of said predetermined target and another target situated at lesser range, said means for sensing producing a second control signal upon said range closure, utilization signal generating means, and means for applying said first and second control signals to said last-named means to produce said utilization signal upon the concurrence of said first and second control signals.

2. In an angle tracking radar receiver, first means for generating a first signal representing the angular deviation relative to the radar tracking axis of a predetermined target, second means for generating a second signal representing the angular deviation relative to said axis of the target nearest the radar, means for comparing said first and second signals and for generating a first control signal upon the inequality of said first and second signals, means for generating a third signal at a predetermined time prior to the reception of the signal representing said predetermined target, means for sensing the concurrence of said third signal and a received target signal to produce a second control signal, utilization signal generating means, and means for applying said first and second control signals to said last-named means to produce said utilization signal upon the concurrence of said first and second control signals.

3. In an angle tracking radar; said radar including continuously operable means for receiving target signals and first actuable means connected to said receiving means for generating a first signal representing the angular deviation relative to the radar tracking axis of a predetermined target; second actuable means connected to said receiving means for generating a second signal representing the angular deviation relative to said radar tracking axis of the target corresponding to the first occurring of the target signals received during each radar repetition interval, means for comparing said first and second signals and for generating a first control signal upon the inequality of said first and second signals, first gate generating means connected to said receiving means for producing a first and a second series of gating signals recurrent at the radar repetition rate, each said second gating signal occurring a fixed time later than a corresponding one of said first gating signals within each radar repetition interval, said second gating signal being produced at a time determined by that of the reception of the signal representing said predetermined target, means for applying said second gating signal to said first actuable means for the actuation thereof, second gate generating means resettable at the radar repetition rate and connected to said receiving means for producing a third series of gating signals, each said third gating signal being produced at a time determined by that of the reception of the first occurring of the target signals received during each radar repetition interval, means for applying said third gating signal to said second actuable means for the actuation thereof, gating means connected to said receiving means, means for applying said first gating signal to said gating means for the actuation thereof, said gating means producing a second control signal upon the concurrence of said first gating signal and a received target signal, utilization signal generating means, and means for applying said first and second signals to said last-named means to produce said utilization signal upon the concurrence of said first and second control signals.

4. In an angle tracking radar receiver, first actuable means for generating a first signal representing the angular deviation relative to the radar tracking axis of a predetermined target, second actuable means for generating a second signal representing the angular deviation relative to said radar tracking axis of the target nearest the radar, means for comparing said first and second signals and for generating a first control signal upon the inequality of said first and second signals, first gate generating means for producing a first and second gating signal recurrent at the radar repetition rate, said second gating signal occurring a fixed time later than said first gating signal within the radar repetition interval, said second gating signal being produced at a time determined by that of the reception of the signal representing said predetermined target, means for applying said second gating signal to said first actuable means for the actuation thereof, second gate generating means resettable at the radar repetition rate for producing a third gating signal, said third gating signal being produced at a time determined by that of the reception of the first occurring of the target signals received during the radar repetition interval, said first occurring signal representing said nearest target, means for applying said third gating signal to said second actuable means for the actuation thereof, gating means connected to receive all target signals received during the radar repetition interval, means for applying said first gating signal to said gating means for the actuation thereof, said gating means producing a second control signal upon the concurrence of said first gating signal and a received target signal, utilization signal generating means, and means for applying said first and second control signals to said last-named means to produce said utilization signal upon the concurrence of said first and second control signals.

5. In an angle tracking radar receiver, first actuable means for generating a first signal representing the angular deviation relative to the radar tracking axis of a predetermined target, second actuable means for generating a second signal representing the angular deviation relative to said radar tracking axis of the target nearest the radar, means for comparing said first and second signals and for generating a first control signal upon the inequality of said first and second signals, first gate generating means for producing a first and a second series of gating signals recurrent at the radar repetition rate, each said second gating signal occurring a fixed time later than a corresponding one of said first gating signals within each radar repetition interval, said second gating signal being produced at a time determined by that of the reception of the signals representing said predetermined target, means for applying said second gating signal to said first actuable means for the actuation thereof, second gate generating means for producing a third series of gating signals recurrent at the radar repetition rate, each said third gating signal being produced at a time determined by that of the reception of the signal representing said nearest target, means for applying said third gating signal to said second actuable means for the actuation thereof, gating means connected to receive all target signals received during the radar repetition interval, means for applying said first gating signal to said gating means for the actuation thereof, said gating means producing a second control signal upon the concurrence of said first gating signal and a received target signal, alert signal generating means, and means for applying said first and second control signals to said last-named means to produce said alert signal upon the concurrence of said first and second control signals.

* * * * *